June 14, 1960  W. A. ROSS  2,940,307
BRAKE TESTER
Filed Nov. 6, 1957  8 Sheets-Sheet 1

INVENTOR.
William A. Ross,
BY

June 14, 1960 W. A. ROSS 2,940,307
BRAKE TESTER
Filed Nov. 6, 1957 8 Sheets-Sheet 5

INVENTOR.
William A. Ross
BY

United States Patent Office 2,940,307
Patented June 14, 1960

2,940,307
BRAKE TESTER

William A. Ross, Springfield, Ill., assignor, by mesne assignments, to Dura Corporation, Oak Park, Mich., a corporation of Michigan Filed Nov. 6, 1957, Ser. No. 694,753

27 Claims. (Cl. 73—122)

This invention relates, in general, to a brake tester, and has particular relation to an improved brake tester for testing the brakes of vehicle wheels.

More particularly, the invention relates to a brake tester embodying improvements in brake testers, in general, of the type disclosed and claimed in Ira A. Weaver, Patent No. 1,892,919, patented January 3, 1933.

In the brake tester of the aforementioned patent, there are a plurality of movable members onto which the vehicle wheels are adapted to move; also a gauge for each of such members and operative connections between the movable members and their respective gauges, so that when the brakes are applied, the amount of brake effort for each wheel is registered on the gauge for such wheel, by the amount of movement of the movable member for that wheel and the resulting action of the operative connection between the movable member and its gauge.

Prior to the present invention, the vehicle was driven onto the brake tester, and the readings for the respective wheels were indicated by dials, liquid in tubes, or by other method, to give, for each wheel, the total pounds of braking energy used to make the stop.

It was then necessary for the attendant to punch a record card to show the reading for each wheel, then add the number of pounds for the respective wheels, either mentally, or on paper, to ascertain the total braking effort, and, with the known weight of the vehicle, the percentage of the braking effort in relation to the weight of the vehicle could be figured or estimated.

Requirements have been set up that the vehicle brakes must be equalized within a certain percent in relation of one rear wheel to the other rear wheel, as well as the front wheels in relation to one another. The two rear wheels must also be within a certain percentage of the total braking effort on the two front wheels.

Public inspection requires an attendant to punch a card showing the reading for each brake and then, according to prior practice, it has been necessary mentally, or on paper, to add the figures for the four readings, and then to divide the total figure by the total weight of the vehicle to get the percentage of braking effort. If this is above the average required, then the vehicle is passable and the card is then punched or marked accordingly. All of the foregoing consumes time and has often held up considerably a line of vehicles awaiting testing.

One of the main objects of the present invention is to provide an improved brake tester that will overcome the shortcomings of prior brake testers and more particularly a brake tester which will permit the entire performance of the brake testing operation to be completed in less time and without calculations mentally, or on paper, as referred to herein.

Another object is to provide a brake tester having a fifth indicating means, which, in the operation of indicating the brake effort for each wheel, will give a fifth reading that will indicate the total sum of the brake effort of the four brakes simultaneously with the individual indications for the respective brakes.

Another object is to provide a brake tester in which the reading of the total brake effort of the four brakes will be accurate and may be held for an appreciable time.

Another object is to provide a brake tester having recording means, such as punch means or other suitable means, for recording not only the braking effort at each wheel, but also, the total brake effort at all of the wheels.

Another object is to provide a fifth recording means which will automatically add the four readings of the brake tester and which is operable in such manner that in a matter of a few seconds, a card, for example, may be inserted in the recording means, a handle depressed, or otherwise operated, and the card removed with all five readings (i.e. individual readings for each wheel and total reading for all wheels). This eliminates any chance of error and any doubt on a vehicle operator's mind as to the competency or honesty of an attendant.

While other means are contemplated within the broader aspects of the invention, another and more specific object resides in the arrangement of double trees, or other means, connected to the four rods leading to the indicators for indicating the brake efforts individually at the respective wheels, for totaling the brake efforts at the four wheels of the vehicle.

Another object is to provide an improved brake tester embodying the features set forth and which will operate accurately and can be manufactured economically; also such a brake tester in which the parts are accessible and the indications clearly in view.

Although, in its broader aspects, the invention is not limited thereto, another object is to provide an improved brake tester with the features herein set forth and in which the individual brake efforts at the respective wheels and the total braking effort may be shown by the liquid levels in graduated indicating tubes.

Another object is to provide a brake tester having a fifth indicating means calibrated at four times the braking effort shown on each of the four indicating scales representing each brake of the vehicle.

Another object is to provide a brake tester in which the fifth indicating means is grouped with the indicating means for indicating the brake effort for each wheel to permit simultaneous reading of the brake effort for each wheel as well as the total sum of the brake effort of the brakes for the four wheels.

Another object is to provide a brake tester in which the fifth recording means is grouped with the recording means for recording the brake effort for each wheel to permit simultaneous and expeditious operation of the recording means for each wheel as well as the recording means for the total sum of the brake effort of the brakes for the four wheels.

Further objects and advantages of the invention will be apparent from the following detailed description taken in connection with the accompanying drawings, it being understood that the invention is limited only within the scope of the appended claims and not to the particular embodiment selected for illustration.

Figure 1:
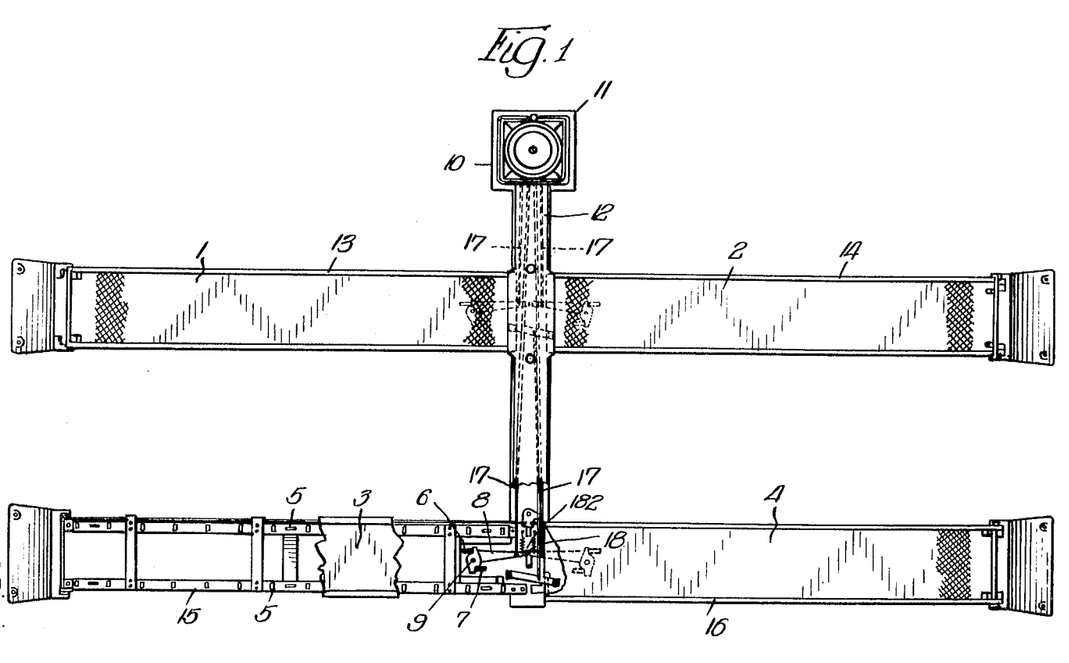
Figure 1 is a top plan view of a brake tester embodying the present invention, certain of the traction plates on which the wheels of the vehicle are adapted to roll during the testing operation being partially broken away to show some of the underlying structure including, more or less diagrammatically, the lever arms and pull rods which are actuated by the movement of the traction plates under the braking action at the respective wheels.

Referring now to the drawings, the four traction plates 1, 2, 3 and 4, onto which the four wheels of a vehicle are adapted to roll, are movable endwise in response to the application of the brakes for the respective vehicle wheels (not shown) and correspond, in general, with the movable plates shown and more fully described in Ira A. Weaver Patent No. 1,892,919, patented January 3, 1933.

Suffice it, for the purpose of the present description, to state that the plates or members 1, 2, 3 and 4 may ride on antifriction rollers 5 and that their top surfaces may be roughened to prevent the vehicle-wheel tires, while on them, from slipping.

Figure 2:
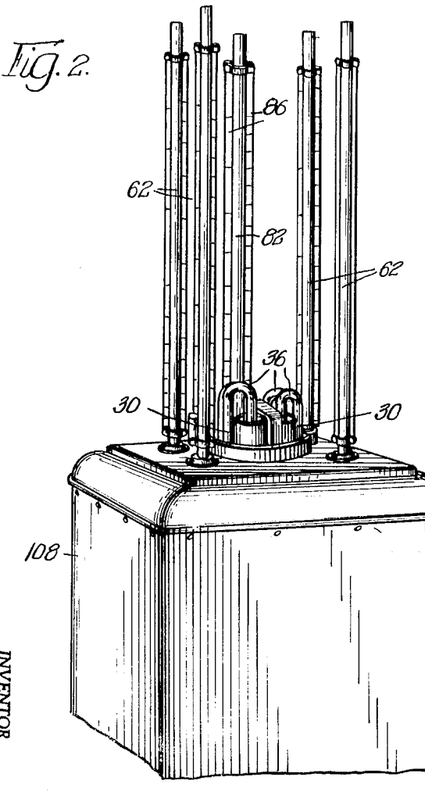
Figure 2 is a fragmentary perspective view showing from the front the upper portion of the upright standard of the tester and the indicating tubes with the glass enclosure and dome top removed.
Figure 3:
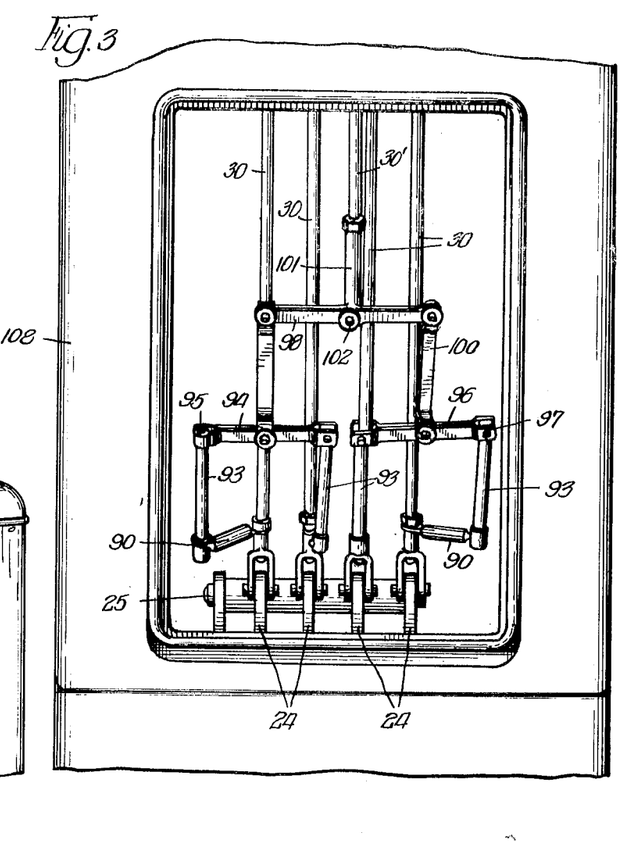
Figure 3 is a fragmentary rear view of the upright standard of the tester showing the mechanism for totaling the four brake tester readings.

Extending downwardly from the under side of each member 1, 2, 3 and 4 are, for example, a pair of lugs or abutments 6 and 7 which cooperate with shoulders of a lever 8, there being one such lever for each member 1, 2, 3 and 4. Each lever is pivoted at 9 on the base plate which has a portion 10 on which the indicator pedestal or standard 11, shown in Figures 2 and 3, is mounted, transverse portion 12, and extensions 13 and 14 and 15 and 16 projecting at right angles thereto.

As previously stated each plate 1, 2, 3 and 4 has a lever 8 and each lever 8 actuates a pull rod 17 in response to movement responsive to the application of the brakes of the vehicle with the vehicle wheels on the respective plates. Each lever 8 is pulled in the opposite direction about its pivot 9 by one or more coiled springs, one spring 18 being shown in Figure 1 and two springs 19 and 20 being shown more or less diagrammatically in Figure 10 for this purpose.

Figure 5:
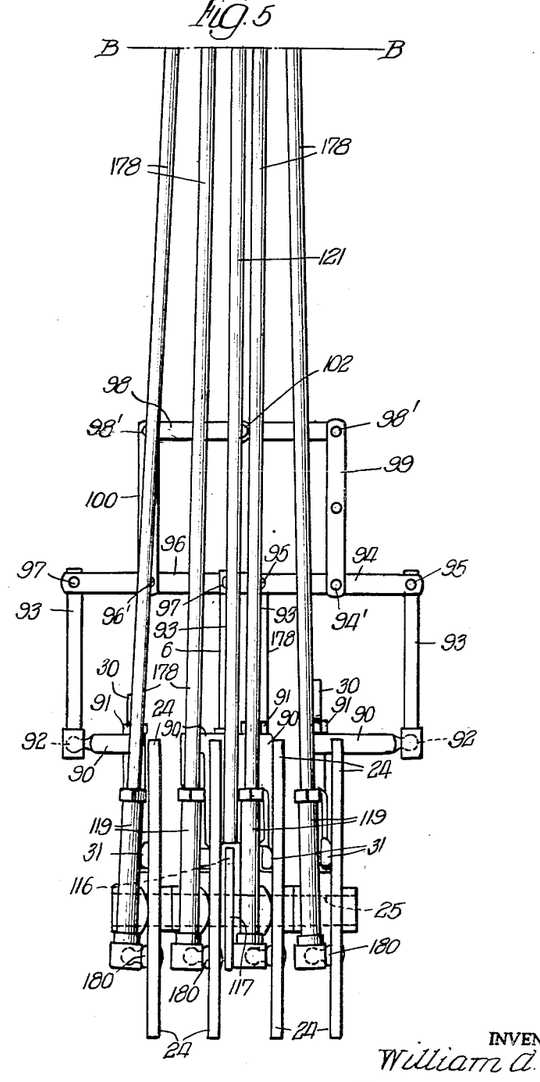
Figures 10, 11:
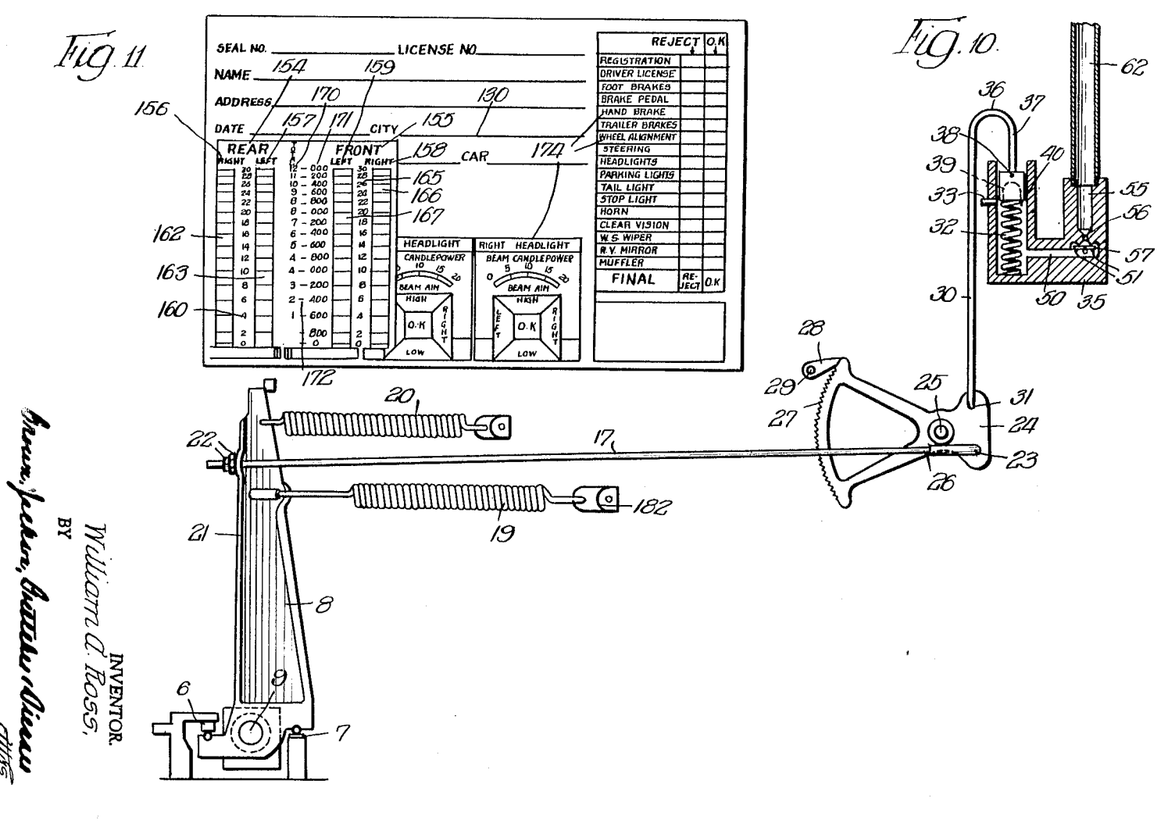
Figure 10 is a diagrammatic view showing the operative connection between one of the lever arms operated by one of the traction plates and its indicating means.
Figure 11 is a view showing one of the cards for use with the brake tester of the present application and on which the brake effort for each wheel and the total sum of the brake effort for the four brakes are recorded.

In the arrangement shown in Figure 10 the lever 8 is illustrative of all four levers, one for each member 1, 2, 3 and 4. Its pivot shown at 9 and the lugs or abutments on the adjacent member (i.e. 1, 2, 3 or 4) are shown at 6 and 7. In Figure 10 the pull rod 17 extends at one end through an opening in a flange 21 on lever 8 and has nuts 22 screwed thereon and abutting, without clearance, the flange 21. The opposite end of each rod 17 is pivotally connected at 23 to a sector 24 rockable on a horizontal shaft 25. The connection between each rod 17 and its sector 24 may be adjustable at 26. The four sectors 24 (i.e. one for each member 1, 2, 3 and 4) are shown in Figure 5. These sectors and the related mechanism, to be presently described, are housed within the hollow base or lower portion of the indicator pedestal or standard 11.

Any movement imparted to any one of the rods 17 by its movable traction plate 1, 2, 3 or 4, by application of the brakes of the respective vehicle wheels, will cause the sector 24 connected to that rod 17 to pivot around the shaft 25. Each sector 24 has peripheral teeth 27 (shown on one of the sectors in Figure 7) with which a related pawl 28 (one for each sector) engages, to retain the sector in the maximum position to which it is moved by the movement of the related member 1, 2, 3 or 4. The pawls 28 are mounted to rock on a shaft 29 and this shaft may have pins or the like (not shown) which, when the shaft is rocked by a foot piece, or trip bar, or in any other suitable manner, will release the pawls 28 from engagement with the sector teeth 27, for example, as more fully disclosed in the Ira A. Weaver patent previously identified herein.

Figures 7, 8:
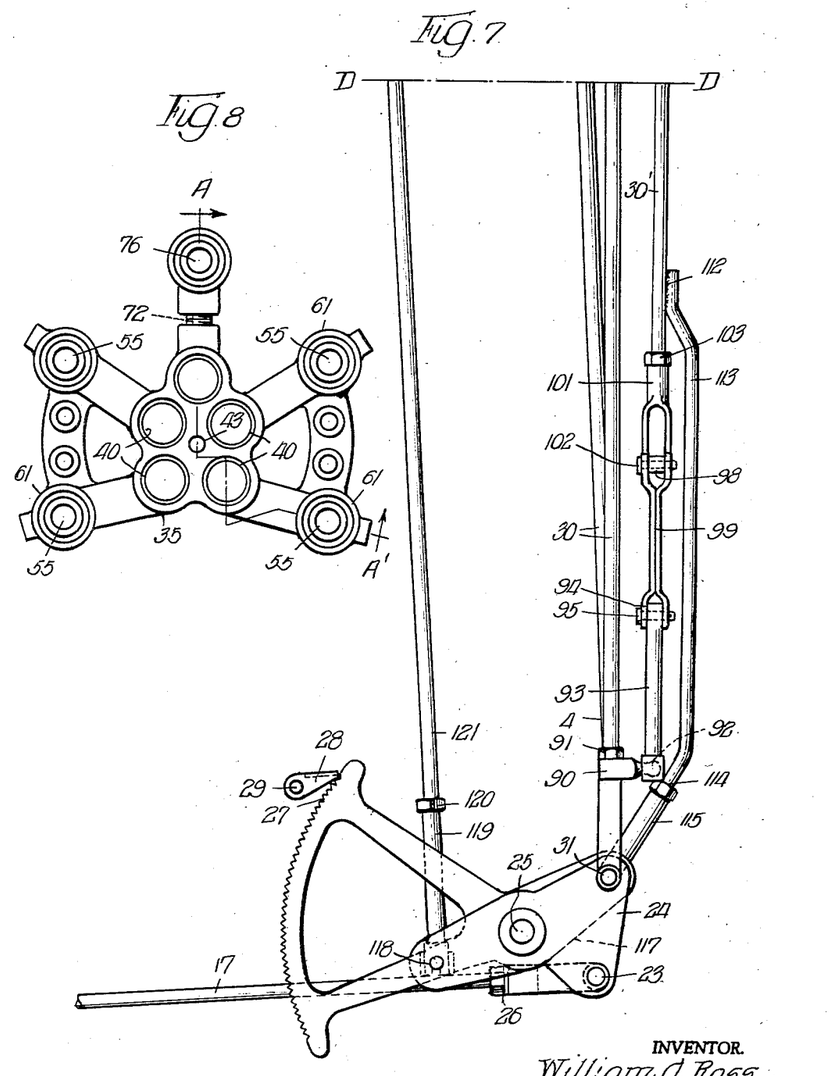
Figure 8 is a more or less diagrammatic top plan view of the indicating head.

Another portion of each sector 24 (Figure 7) has the lower end of a rod 30 (one such rod for each sector 24) pivoted to it at 31. Each rod 30 and rod 30' for piston 47 are urged or moved upwardly by a coiled expansible spring 32, one disposed within each of the cylindrical cavities 40 and 42, to be presently described, and acting endwise between the related pistons 39 and 47 and the screw-threaded cap member 41 screwed into the lower ends of the cylinders 40 and 42. Each spring 32, therefore, tends to lift its rod 30 or 30' to rock the related sector 24 counterclockwise about the shaft 25 into its normal or inoperated position, as illustrated in Figure 7.

The upper end of each rod 30 has a bent-over part 36 (Figures 4, 6 and 9) with a portion 37 extending downwardly and pinned or otherwise fastened at 38 to a plunger or piston 39. Each piston 39 fits snugly and is slidable up and down in a cylindrical cavity 40 in the indicating head casting 35. There are, of course, four such pistons and cylindrical cavities, one for each of the traction plates or members 1, 2, 3 and 4 of the brake tester. The lower end of each cavity 40 is closed by a screw-threaded cap member 41.

The casting 35 has a fifth cylinder or cylindrical cavity 42 grouped with the four cylinders 40 and forming part of the particular totalizing indicator selected for illustration, it being understood that other forms of individual and totalizing indicators, such as dials, or the like, are contemplated within the broader aspects of the present invention.

In its central portion, casting 35 has a liquid supply chamber or reservoir 43 connected to the four cylinders 40 and to the fifth cylinder 42, grouped symmetrically around it, by conduits or passages 44, one of which leads to each of the cylinders 40 and a further conduit or passage 45 leading to the cylinder 42. The inner walls of the cylinders 40 and 42, above their respective pistons, are slotted or omitted at 46, so that the liquid in the reservoir 43 may readily find access to all of the cylinders both above and below the pistons therein. Each piston 39 and the fifth piston 47 which is slidable in the cylinder 42, in its lower end or underside, has a cavity or recess filled with air to act as a cushion for the liquid. The cavities in the pistons 39 are indicated at 48 and the cavity in the piston 47 is indicated at 49.

The interior of the lower end of each cylinder 40 is connected through a conduit or passage 50 and ports 51 in a supporting flange 52 on the lower end or underside of an upright tubular member 53, with a small chamber 54 inside the flange. Each of these chambers 54 is in communication with a larger chamber 55 above, by means of a small or restricted port 56, cooperating with which is an apertured disc or valve 57. Each valve disc 57 is adapted to rest normally on cross-pins 58 below the port 56, one of such valves being shown in Figure 9.

When the valve discs 57 are resting on their supporting rods or pins 58, the ports 56 are fully open, and when the valve discs are forced up, as will presently appear, the ports 56 are in large measure, but not completely closed by the discs because the central one of the several holes or apertures 59 through the discs are open, such single holes being materially smaller in size than the ports 56.

Members 53, one defining each chamber 55, are mounted in cylindrical cavities in upstanding portions 61 (Figure 4) of the main casting 35. In the illustrated embodiment of the invention the ports 56 are formed in the lower ends of these members 53.

Each chamber 55 connects or opens into the lower open end of an upright glass, plastic, or other suitable transparent indicator tube 62. Each tube 62 carries, by means of suitable brackets 63, a pair of upright indicator strips 64 and 65. The strip 64 carries a scale 66 graduated in any approved manner, as in number of pounds. The height of the liquid in each tube 62 determines the number of pounds braking effort which has been applied to the related member 1, 2, 3 or 4. The number of pounds are indicated by the graduated and numbered markings on the scale 66.

The strip 65 on the opposite side of the tube 62 carries a scale 68 with each marking 20% less than the line above and is used for quickly determining the percentage of braking between any of the brakes.

The interior of the lower end of the fifth cylinder 42 is connected, through a conduit or passage 72 and ports 73 in a supporting flange 52' on the lower end or underside of a fifth upright tubular member 74 with a small chamber 75 inside the flange. The chamber 75 is in communication with a large chamber 76 above, by means of a small port 78. The chamber 76 is defined by the tubular member 74 which connects or opens into the lower end of a fifth upright glass, plastic, or other suitable transparent indicator tube 82.

The tube 82 carries, by means of brackets 83, a pair of upright indicator strips 84 and 85. Each strip 84 and 85 is shown as carrying a scale 86 graduated in any approved manner, as in number of pounds. The scales 86 are calibrated to read, for example, in pounds, four times the amount indicated on the other four scales 66, which are directly related to each of the four traction plates 1, 2, 3 and 4 and in the same positions as these plates. There is no inertia valve for the tube 82, such as exemplified by the inertia valves 57 for the tubes 62.

Upon downward movement of the piston 47 in the cylinder 42 the liquid is forced up into the tube 82 and gives in this tube a reading which will be the total sum of the four brakes, when taken through means for totaling the brake efforts at the four brakes, as will be presently described. Screw-threaded plugs 88 are screwed into the casting 35 beneath the lower ends of the tubular members 53 and 74. Cap nuts 89 are screwed onto and clamp packing or sealing rings 90 against the upper ends of the upstanding portions 61 of the casting 35.

In order to move the piston 47 downwardly in the fifth cylinder 42 amounts to give, by the level of the liquid in the fifth tube 82 the total sum of the braking effort of the four brakes of the vehicle, totaling means is employed for actuating the piston 47. While other forms of totaling means, such, for example, as pulleys and cables may be employed within the broader aspects of the present invention, a double tree totaling mechanism has been selected for illustration.

Referring particularly to Figures 3, 5 and 7, each pull rod 30 has a bracket 90 secured between the parts of the lower end of the rod by a nut 91. Each bracket 90 has a ball 92 at the outer end thereof and links, one for each of the four brackets 90, have sockets in which the balls 90 engage, to form ball joint connections between each bracket 90 and its link 93. The links 93 of one pair of such links each is pivotally connected at its opposite end to crosspiece 94 at 95 to form a single tree. Each of the other two links 93 is pivotally connected at its opposite end to a crosspiece 96 at 97 to form a second single tree.

The single trees are connected to a crosspiece 98 by links 99 and 100 to form a double tree. The link 99 is pivoted at one end at 94' to the crosspiece 94 and at its opposite end at 98' to the crosspiece 98. The link 100 is pivotally connected at one end at 96' to the crosspiece 96 and at its opposite end at 98' to the crosspiece 98. A link 101 has arms straddling and pivoted at 102 to the crosspiece 98 intermediate its opposite ends. The opposite end of the link 101 has screw connection, locked by a nut 103, with the lower end of the fifth pull rod 30'. The upper end of the pull rod 30' has a bent-over part 104 (Figure 9) with a portion 105 extending downwardly and pinned or otherwise fastened at 38' to the piston 47.

The upper ends of the five tubes 62 and 82 extend through a plate 106 and the upper ends of the tubes may be normally closed by a disc or plate (not shown) free to rise to permit the ready escape or expulsion of air from the tubes when the liquid, which may be oil, or other suitable liquid, is forced upwardly into the tubes, as shown and described in the Ira A. Weaver patent previously identified herein.

The piston 47 has the spring pocket 49 which is also an air chamber which cushions the column of oil forced into the tube 82 similar to the action of the air chambers for the other pistons. Without these air chambers one or two drops of oil might leave the column of oil in the tube and be forced out of the upper end of the tube. The piston 47 and the other pistons have very close fits in the cylinders 42 and 40 which allow practically no slippage of the oil while the piston is traveling down the cylinder and will hold the reading for a period of half an hour without any appreciable drop.

The indicating liquid, colored, if desired, to make it more conspicuous, is introduced into the chamber 43, for example, through an inlet pipe and connecting passage in casting 35 to the top of a right-angle pipe as more fully disclosed in the aforementioned Ira A. Weaver patent, so that when the liquid is introduced, there is assurance that the supply chamber 43 and all of the associated chambers and the lower parts of tubes 62 and 82, have been filled with liquid sufficient to cause its surface to register with the zero graduations for all of the tubes.

The four tubes 62 are preferably grouped together in the same general relation as are the four traction plates 1, 2, 3 and 4 with which they are individually operatively associated, and the fifth tube is grouped with the four tubes, so that the occupant of the tested vehicle, without leaving his seat in the latter, may readily ascertain the brake adjustments of the four wheels and the total brake effort by the heights of the liquid in the four tubes 62 and in the fifth tube 82.

The upright indicating tubes 62 and 82 and the liquid operating mechanism described are mounted in a hollow standard 108 in any appropriate manner, the tubes 62 and 82 all being visible through a glass, plastic, or other transparent enclosure 109 covered with a top cover or dome 110, secured in place, for example, by an upright post or rod 111.

When the indicating liquid is forced up the graduated tubes by the means described, it will be retained in such tubes by the operating plungers or pistons 39 and 47, by reason of the action of the locking pawls 28 on the ratchet teeth 27 of the sectors 24. The liquid is not ordinarily permitted to descend to normal or zero level until the vehicle passes off of the traction plates 1, 2, 3 and 4 on which it has rested, although means may be provided so that the operator may release the columns of liquid by the action of his foot.

The indicating liquid release, however, is generally accomplished automatically by the vehicle itself, for example, by means (not shown) such as disclosed in the herein identified Ira A. Weaver patent.

For the purpose of recording as well as indicating the total braking effort at all wheels of the vehicle, the pull rod 30' is connected at 112 to an extension 113, which is connected at 114 to operate a link 115. The link 115 has pivotal connection at 116 (Fig. 5) with an arm 117, which is rockable on the shaft 25. The arm 117 has ball joint connection at 118 with a link 119 having screwed connection, locked by a nut 120, with a recording rod 121.

The recording rod 121 extends upwardly to a recorder, indicated in its entirety at 122, and is connected by a ball joint connection 123 to a vertically movable bar 124. The bar 124 and four other bars 125, one for each of the traction plates 1, 2, 3 and 4, are mounted for vertical sliding movements in a frame 126 which holds the bars 124 and 125 in alignment.

Each bar 124 and 125 carries a punch head or frame 128 having a slot 129 formed between upright guides 129' for receiving a record card 130, such as shown, for example, in Figure 11; also a punch 132 slidable generally horizontally in bores 133 in the portions 134 of the frame 128. A coiled expansible spring 135 surrounds each punch 132 and acts endwise between a shoulder 136 on the frame 128 and an abutment 138 fixed to the punch 132. The springs 135 normally retain the punch ends 139 of the punches 132 in retracted positions and return the same to such positions spaced from the outer leg 140 of the frame 128, to permit disposition of the card 130 therebetween. The bore 133 continues through the adjacent end of the leg 140 at 133' so that when the punch 132 is operated, it is forced through the card 130 and into the bore 133'.

Figure 6:
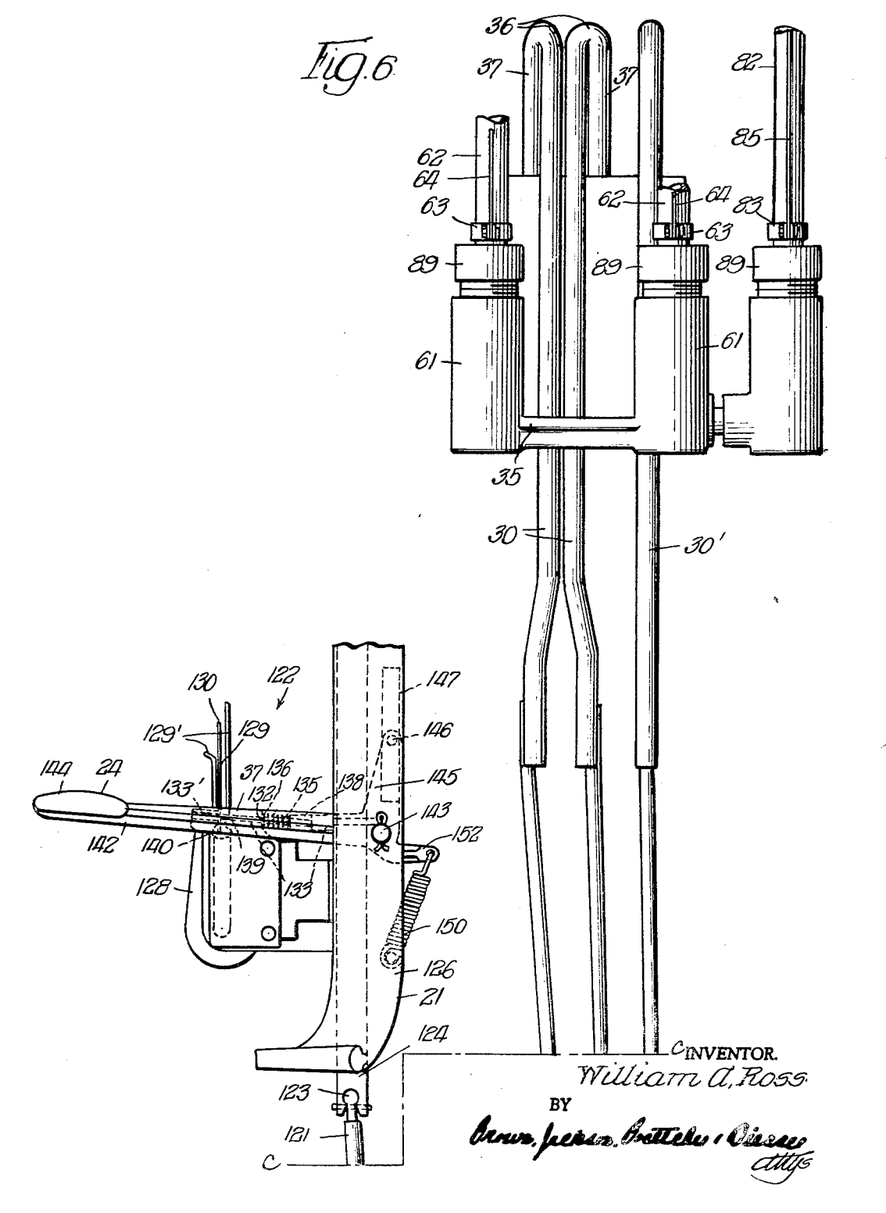
Figures 6 and 7 are parts of a side elevation view which, when placed with Figure 7 below Figure 6 and with the line C—C of Figure 6 on the line D—D of Figure 7, form a side elevational view of the upper indicating head, recording mechanism and actuating connections shown in Figures 4 and 5.

A hand lever 142 is pivoted to the frame 126 at 143. The outer end of the lever 142 has a hand piece 144. Arms 145 on the lever 142 are pivoted at 146 to a punch plate 147. When the bars 124 and 125 are raised to position for cooperation of the punch plate 147 with the adjacent ends of the punches 132 and the lever 142 is pressed downwardly by engaging the hand piece 144, the punch plate 147 forces the punches 132 of all of the bars 124 and 125 through the card 130 and into the bores 133'. When the hand lever 142 is released, the spring 150 connected between the frame 128 and an arm 152 on the lever 142, returns the lever 142 to its original position, as shown in Figure 6, allowing the springs 135 to retract the punches 132 from the punched card 130.

As shown in Figure 11, the card 130 bears the words "REAR" and "FRONT" at 154 and 155 with the words "Right" and "Left" beneath the word "REAR" at 156 and 157 and beneath the word "FRONT" at 158 and 159. Between the "Right" and "Left" markings at 156 and 157 is a column 160 of numbers with spaces 162 and 163 on opposite sides of the same in which punched holes opposite the respective numbers 160 record in the spaces 162 the brake effort at the right rear wheel and in the spaces 163 the brake effort at the left rear wheel. Similarly between the "Right" and "Left" markings 158 and 159 is a column 165 of numbers with spaces 166 and 167 on opposite sides of the same in which punched holes opposite the respective numbers 165 record in the spaces 166 the brake effort at the right front wheel and in the spaces 167 the brake effort at the left front wheel when the brake tester is operated as will be presently described.

Between the columns for the individual brake recordings are two columns of numbers 170 and 171 headed by the word "TOTAL" and between the columns 170 and 171 are spaces 172 in which punched holes opposite the numbers indicate the total brake effort at all four wheels.

The card 130 also bears places for the vehicle owner's name and address and for the date, seal number and license number and for other items to be checked at 174.

For the purpose of individually moving the recording bars 125 and their punches 132 vertically in amounts in accordance with the movements of the traction plates 1, 2, 3 and 4 when the brakes at the respective vehicle wheels are applied, one of the bars 125 is individually connected to each of the plates 1, 2, 3 and 4.

Figure 4:
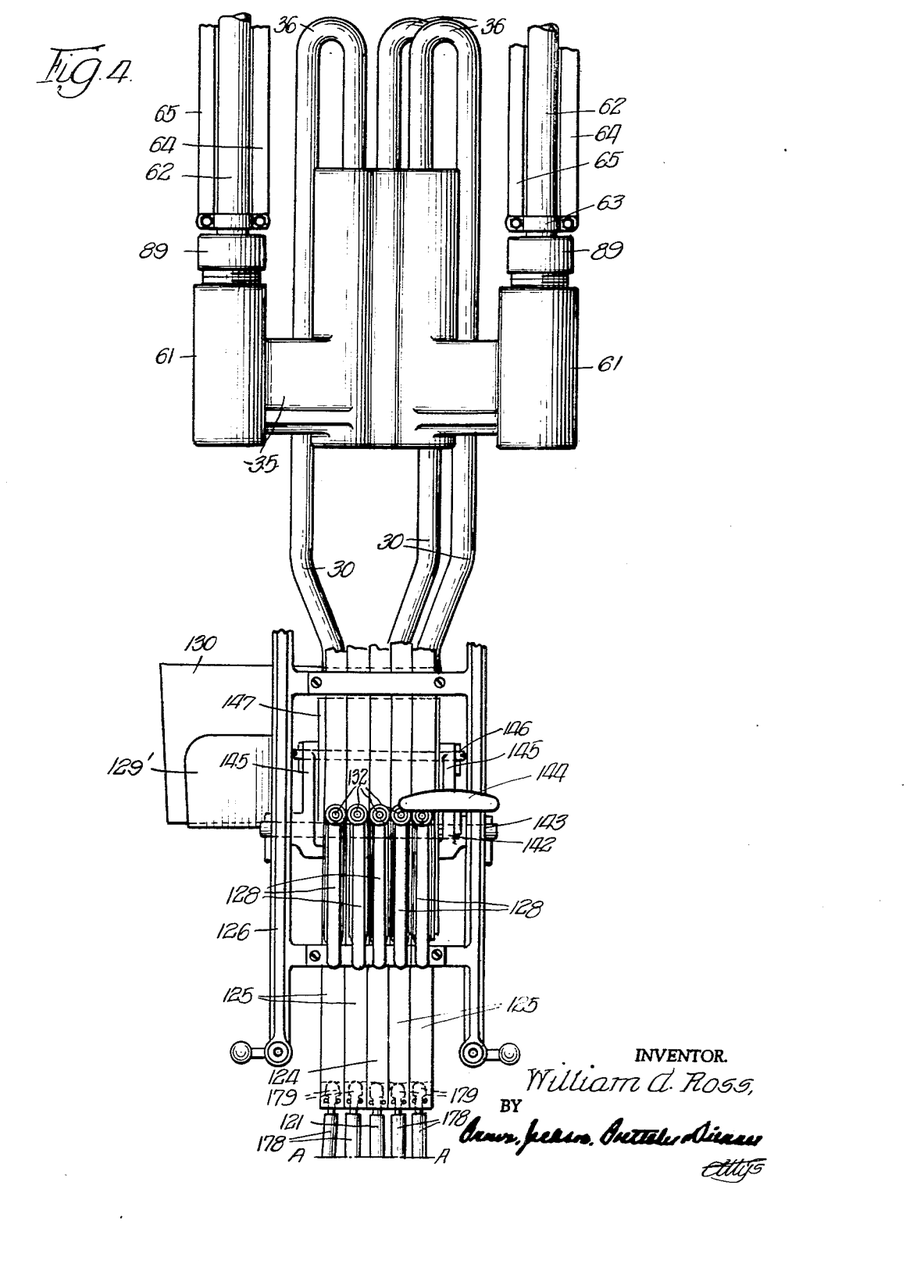
Figures 4 and 5 are parts of a more or less diagrammatic view which, when placed with Figure 5 below Figure 4 and with the line A—A of Figure 4 on the line B—B of Figure 5, form a complete diagrammatic front view, showing the upper indicating head, the recording mechanism beneath the indicating head and the actuating connections for actuating the five indicating and recording mechanisms from the rods which, in turn, are actuated by the movement of the traction plates for the vehicle wheels.

The connections selected for illustration are shown in the form of four individual recording rods 178 (Figures 4 and 5). The upper end of each rod 178 is connected, for example, by a ball and socket joint 179 with its recording bar 125. The lower end of each rod 178 is individually connected to its related sector 24, for example, by a ball and socket joint connection 180. Thus, movement of each traction plate 1, 2, 3 and 4 moves its related recording bar 125 a corresponding or related amount.

In Figure 10, the spring 19 has means at 182 for adjusting the tension thereof. The spring 20 preferably has no initial tension, i.e., no tension when the related lever 8 is in the position shown.

The brake tester thus shown and described operates substantially as follows:

Assume that the vehicle, the brakes of which are to be tested, is driven up onto the tester from the right, as the brake tester is viewed in Figure 1, there will be one vehicle wheel on each of the four traction plates 1, 2, 3 and 4. While the wheels are rolling on the respective plates 1, 2, 3 and 4, the vehicle brake pedal is depressed and applies all four brakes, i.e. the brakes at the four wheels of the vehicle. As a result, the four traction plates 1, 2, 3 and 4 will be moved along with the vehicle wheels, each plate 1, 2, 3 and 4 being moved longitudinally a distance corresponding to the braking effort of the brake at its particular wheel. Such travel of the individual plates 1, 2, 3 and 4 is resisted by the action of its springs 19 and 20, or by the action of its single spring, where each lever 8 has only a single spring.

As soon as the drags on the plates 1, 2, 3 and 4 have terminated, the springs 19 and 20 will automatically contract and thereby effect the restoration of all four plates to their neutral or normal, central positions with the ends of the levers 8 against the stops 182, one of which is indicated in Figure 1. The plates cannot however, pass such central positions because they are preferably locked or prevented from so doing, as more fully disclosed in the Ira A. Weaver patent previously identified herein.

Thus the return of any such plate cannot modify the return of any other plate and cause a false reading of the indicator.

The specified forward movements of the four traction plates 1, 2, 3 and 4 are transmitted individually through the rods 17 to the respective sectors 24, which are rocked clockwise (Figure 7) about the shaft 25 amounts or distances proportionate to the braking forces acting on the four wheels on the individual plates 1, 2, 3 and 4. This rocking movement of the respective sectors 24 pulls the four rods 30 and their connected pistons 39 downwardly corresponding amounts. The downward movements of the pistons 39 in their cylinders 40 forces conforming or related quantities of liquid up their respective indicator tubes 62, and the ratchet sectors, pistons and columns of liquid may be retained in these positions until released, by releasing the holding pawls 28.

When the liquid passes from the chambers or cylinders 40 into the chambers 55 and the indicator tubes 62 it lifts the discs or valves 57, closing the corresponding ports 59, except, for example, the central aperture through each valve. The result is that the passage of liquid into the individual indicator tubes 62 is retarded so as to give correct, ultimate, individual readings for the respective brakes. In this way, the momentum of the liquid and plates are overcome or compensated for.

Any downward movement of the four rods 30 causes the brackets 90 to lower along with the links 93. This, in turn, lowers the bar or crosspiece 94 of the double tree, as well as the crosspieces 96 and the links 99 and 100. This lowers the top crosspiece 98 a proportional amount and causes the rod 30', to lower the piston 47 in the fifth cylinder 42 a corresponding amount. The downward movement of the piston 47 in the cylinder 42 forces a conforming or related quantity of liquid through the unrestricted passages 72 and 75 and into the fifth indicator tube 82. The scale 86 associated with the tube 82 being calibrated to read four times the amount on the scale 66 will thus read the total amount of the other four tubes 62, which are directly related to the four plates 1, 2, 3 and 4.

The operator and/or attendant may thus, by merely noting the heights of the liquids in the four tubes 62 and in the fifth tube 82, be apprised thereby of not only the braking effort at each of the four brakes but also the total braking effort of the four brakes.

Simultaneously, with the foregoing action for indicating the individual and combined braking efforts, the clockwise rocking movement imparted to the sectors 24 by the movement of the plates 1, 2, 3 and 4 raises the rods 178, each an amount proportional to the amount of movement imparted to its plate 1, 2, 3 or 4. The upward movement of the rods 178 impart corresponding upward movements to the recording bars 125 and their related punches 132.

The downward movement of the rod 30' acts through the extension 113 to rock the arm 117 clockwise a corresponding amount about the shaft 25. The opposite end of the arm 117 acts through the ball joint connection 118 to raise the rod 121 and the connected recording bar 124 and its punch 132 corresponding amounts. Then, with the recording bars 125 and the punches 132 carried thereby elevated in amounts corresponding or proportional to the amounts of movements of the plates 1, 2, 3 and 4 and the recording bar 124 and its punch 132 elevated to record the combined braking effort at the four wheels, the hand piece 144 is depressed.

The clockwise movement of the lever 142 about its pivot 143, imparted by depression of the hand piece 144, moves the punch plate 147 into cooperation with the adjacent ends of the punches 132 and forces the opposite ends of the punches through the card 130. Thus, holes are punched simultaneously in the spaces 162, 163, 166, 167 and 172 of the card 130 to record by the related numbers, or markings, the brake efforts at each of the respective wheels and the total brake effort at all of the wheels.

The backing-up braking action on the wheels can be indicated and recorded, if desired, by backing the vehicle onto the plates 1, 2, 3 and 4 of the brake tester and applying the brakes while it is so moving.

Figure 9:
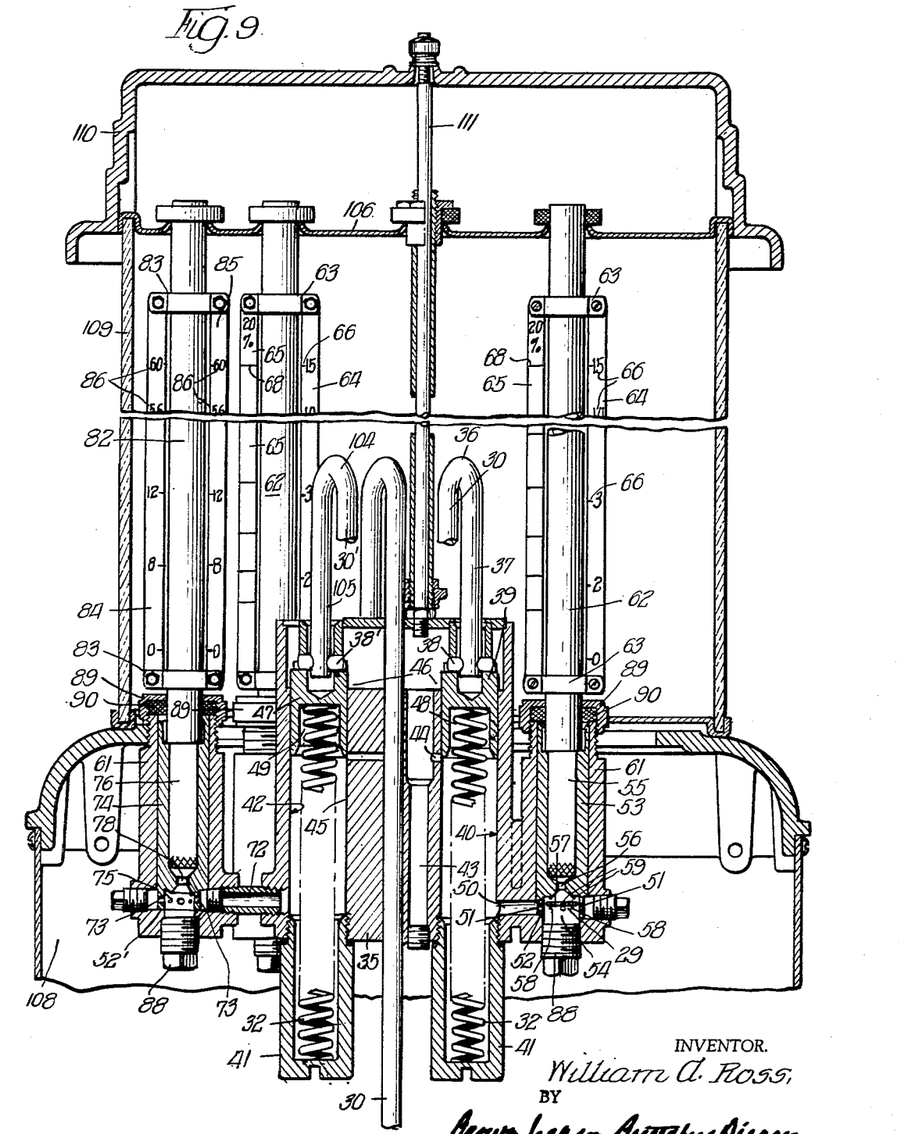
Figure 9 is a vertical section through the indicating head taken substantially on the line 9—9 of Figure 8, and with the glass enclosure and dome top in place.

As previously set forth, the markings on the scales 68 are arranged on a logarithmetic scale, so that each mark downward is 20% of the next one above. Thus, regardless of the height to which the liquid rises, the viewer can quickly visualize whether the corresponding brakes on the two sides of the vehicle are equalized by the markings on the correlated tubes, either for the front or for the rear wheels of the vehicle. Where the percentage scale 68 is employed, as shown in Figure 9, in association with the scale 66, the viewer can ascertain at a glance whether or not the brake pressure for the wheels are less or greater than 20% difference.

If desired, the tubes or scales may be graduated in pounds pull of the wheels on the wheel-plates, stopping distance or other related scale.

The embodiment of the invention shown in the drawings is for illustrative purposes only and it is to be expressly understood that said drawings and the accompanying specification are not to be construed as a definition of the limits or scope of the invention, reference being had to the appended claims for that purpose.

While, for example, the foregoing description refers to four brakes, one at each of the four wheels of the vehicle, it is to be understood that if only one, two or three wheels have brakes, the tester of the present application would still indicate and record the braking effort at any or a plurality of such brakes.

I claim:

1. In a brake tester, in combination, a plurality of members movable in response to the application of the brakes of a vehicle, a totalizing indicator, and an operative connection between said members and said totalizing indicator including mechanical connection with said members which is collectively responsive to the movements of said members and effective when the brakes are applied to indicate at said totalizing indicator the total sum of the brake effort at a plurality of said brakes.

2. In a brake tester, in combination, a plurality of members movable in response to the application of the brakes of a vehicle, a brake effort indicator for each of said members, first operative connections between said members and said indicators and effective when the brakes are applied to indicate at the respective indicators the amount of brake effort at each brake, a totalizing indicator, and a second operative connection between said members and said totalizing indicator including mechanical connection with said first operative connections which is collectively responsive to the movements of said members and effective when the brakes are applied to indicate at said totalizing indicator the total sum of the brake effort at a plurality of said brakes.

3. In a brake tester, in combination, a plurality of first members movable in response to the application of the brakes of a vehicle, a recording member, an operative connection between said first members and said recording member, said operative connection being collectively responsive to the movements of said first members and effective when the brakes are applied to move said recording member to position for recording the total sum of the brake effort at a plurality of said brakes, and means for actuating said recording member when in said position to record said total brake effort.

4. In a brake tester, in combination, a plurality of members movable in response to the application of the brakes of a vehicle, first brake effort recorders one for each of said members, operative connections between said members and said first brake effort recorders and effective when the brakes are applied to move said recorders to positions for recording the amounts of brake effort at each brake, a totalizing recorder, an operative connection between said members and said totalizing recorder, said operative connection being collectively responsive to the movements of said members and effective when the brakes are applied to move said totalizing recorder to position for recording the total sum of the brake effort at a plurality of said brakes, and means for actuating said first brake effort recorders and said totalizing recorder when in said positions to record the amount of brake effort at each brake and the total sum of the brake effort at said plurality of brakes.

5. In a brake tester, in combination, a plurality of movable first members onto which vehicle wheels provided with brakes are adapted to move, a plurality of members mounted for pivotal movement, first operative connections between said first members and said pivoted members for imparting pivotal movement to said pivoted members in accordance with the amount of movement imparted to said first members when the brakes for said vehicle wheels are applied, a brake effort indicator for each of said first members, second operative connections between said pivoted members and said brake effort indicators and effective when the brakes are applied to indicate at the respective indicators the amount of brake effort at each brake, a totalizing indicator, and a third operative connection between said second operative connections and said totalizing indicator, said third operative connection, including mechanical connection with said second operative connections, which is collectively responsive to the movements of said movable first members and effective when the brakes are applied to indicate at said totalizing indicator the total sum of the brake effort at a plurality of said brakes.

6. In a brake tester, in combination, a plurality of movable first members onto which vehicle wheels provided with brakes are adapted to move, a plurality of members mounted for pivotal movement, first operative connections between said first members and said pivoted members for imparting pivotal movement to said pivoted members in accordance with the amount of movement imparted to said first members when the brakes for said vehicle wheels are applied, a brake effort indicator for each of said first members, second operative connections between said pivoted members and said brake effort indicators and effective when the brakes are applied to indicate at the respective indicators the amount of brake effort at each brake, a totalizing indicator, a third operative connection between said second operative connections and said totalizing indicator, said third operative connection, including mechanical connection with said second operative connections which is collectively responsive to the movements of said movable first members and effective when the brakes are applied to indicate at said totalizing indicator the total sum of the brake effort at a plurality of said brakes, a totalizing recorder, a fourth operative connection including mechanical connection between said third operative connection and said totalizing recorder and effective when the brakes are applied to move said totalizing recorder to position for recording the total sum of the brake effort at a plurality of the brakes, and means for actuating said totalizing recorder when in said position to record the total sum of the brake effort at said plurality of brakes.

7. In a brake tester, in combination, a plurality of movable first members onto which vehicle wheels provided with brakes are adapted to move, a plurality of members mounted for pivotal movement, first operative connections between said first members and said pivoted members for imparting pivotal movement to said pivoted members in accordance with the amount of movement imparted to said first members when the brakes for said vehicle wheels are applied, a brake effort indicator for each of said first members, second operative connections between said pivoted members and said brake effort indicators and effective when the brakes are applied to indicate at the respective indicators the amount of brake effort at each brake, a totalizing indicator, a third operative connection between said second operative connections and said totalizing indicator, said third operative connection, including mechanical connection with said second operative connections which is collectively responsive to the movements of said movable first members and effective when the brakes are applied to indicate at said totalizing indicator the total sum of the brake effort at a plurality of said brakes, brake recorders one for each of said first members, a fourth operative connection including mechanical connection between said pivoted members and said brake recorders and effective when the brakes are applied to move said recorders to positions for recording the amounts of brake effort at each brake, and means for actuating said brake recorders to record the amount of brake effort at each brake.

8. In a brake tester, in combination, a plurality of movable first members onto which vehicle wheels provided with brakes are adapted to move, a plurality of members mounted for pivotal movement, first operative connections between said first members and said pivoted members for imparting pivotal movement to said pivoted members in accordance with the amount of movement imparted to said first members when the brakes for said vehicle wheels are applied, a brake effort indicator for each of said first members, second operative connections between said pivoted members and said brake effort indicators and effective when the brakes are applied to indicate at the respective indicators the amount of brake effort at each brake, a totalizing indicator, a third operative connection between said second operative connections and said totalizing indicator, said third operative connection, including mechanical connection, with said second operative connections which is collectively responsive to the movements of said movable first members and effective when the brakes are applied to indicate at said totalizing indicator the total sum of the brake effort at a plurality of said brakes, first brake recorders one for each of said first members, a fourth operative connection including mechanical connection between said pivoted members and said first brake recorders and effective when the brakes are applied to move said first recorders to positions for recording the amounts of brake effort at each brake, a totalizing recorder, a fifth operative connection between said third operative connection and said totalizing recorder and effective when the brakes are applied to move said totalizing recorder to position for recording the total sum of the brake effort at a plurality of the brakes, and means for actuating said first brake effort recorders and said totalizing recorder when in said positions to record the amount of brake effort at each brake and the total sum of the brake effort at a plurality of said brakes.

9. In a brake tester, in combination, a plurality of movable first members onto which vehicle wheels provided with brakes are adapted to move, a plurality of members mounted for pivotal movement, first operative connections between said first members and said pivoted members for imparting pivotal movement to said pivoted members in accordance with the amount of movement imparted to said first members when the brakes for said vehicle wheels are applied, a brake effort indicator for each of said first members, second operative connections between said pivoted members and said brake effort indicators and effective when the brakes are applied to indicate at the respective indicators the amount of brake effort at each brake, a totalizing indicator, and a double-tree mechanism operatively connected between said second operative connections and said totalizing indicator and effective when the brakes are applied to indicate at said totalizing indicator the total sum of the brake effort at all of said brakes.

10. In a brake tester, in combination, a plurality of movable first members onto which vehicle wheels provided with brakes are adapted to move, a plurality of members mounted for pivotal movement, first operative connections between said first members and said pivoted members for imparting pivotal movement to said pivoted members in accordance with the amount of movement imparted to said first members when the brakes for said vehicle wheels are applied, a brake effort indicator for each of said first members, second operative connections between said pivoted members and said brake effort indicators and effective when the brakes are applied to indicate at the respective indicators the amount of brake effort at each brake, a totalizing indicator, a double-tree mechanism operatively connected between said second operative connections and said totalizing indicator and effective when the brakes are applied to indicate at said totalizing indicator the total sum of the brake effort at all of said brakes, a totalizing recorder operatively connected with said double-tree mechanism for movement thereby to position for recording the total sum of the brake effort at all of the brakes, and means for actuating said totalizing recorder when in said position to record the total sum of the brake effort at all of said brakes.

11. In a brake tester, in combination, an indicating head having a plurality of cylinders grouped around it and in which liquid is adapted to be disposed, transparent indicator tubes in communication with said cylinders through restriction valves, said head having an additional cylinder grouped with said plurality of cylinders and in communication with an additional transparent indicator tube, said plurality of transparent indicator tubes each having a first scale for indicating by the height of the liquid therein the braking effort at the brakes of a plurality of the wheels of a vehicle, said additional transparent indicator tube having a scale which reads a multiple of the amount on said first scale, pistons individually responsive to the application of the brakes for a plurality of the wheels of a vehicle and operable in said plurality of cylinders to elevate the liquid in said plurality of indicator tubes to indicate at said plurality of indicator tubes the amount of brake effort for each of said plurality of wheels, and a piston collectively responsive to the application of the brakes for a plurality of the vehicle wheels and operable in said additional cylinder to elevate the liquid in said additional indicator tube to indicate at said additional indicator tube the total sum of the brake effort at said plurality of said brakes.

12. A brake tester, according to claim 11 wherein the additional cylinder has less restricted communication with said additional indicator tube than do the other cylinders with their indicator tubes.

13. In a brake tester, in combination, an indicating head having a plurality of cylinders grouped about it and in which liquid is adapted to be disposed, transparent indicator tubes in communication with said cylinders through restriction valves, said head having an additional cylinder grouped with said plurality of cylinders and in communication with an additional transparent indicator tube, said plurality of transparent indicator tubes each having a first scale for indicating by the height of the liquid therein the braking effort at the brakes of a plurality of the wheels of a vehicle, said additional transparent indicator tube having a scale which reads a multiple of the amount on said first scale, pistons individually responsive to the application of the brakes for a plurality of the wheels of a vehicle and operable in said plurality of cylinders to elevate the liquid in said plurality of indicator tubes to indicate at said plurality of indicator tubes the amount of brake effort for each of said plurality of wheels, and a piston collectively responsive to the application of the brakes for a plurality of the vehicle wheels and operable in said additional cylinder to elevate the liquid in said additional indicator tube to indicate at said additional indicator tube the total sum of the brake effort at said plurality of said brakes, the piston collectively responsive to the brakes for a plurality of the vehicle wheels being actuated by an operative connection which includes a double-tree mechanism.

14. In a brake tester, in combination, an indicating head having a plurality of cylinders grouped around it and in which liquid is adapted to be disposed, transparent indicator tubes in communication with said cylinders through restriction valves, said head having an additional cylinder grouped with said plurality of cylinders and in communication with an additional transparent indicator tube, said plurality of transparent indicator tubes each having a first scale for indicating by the height of the liquid therein the braking effort at the brakes of a plurality of the wheels of a vehicle, said additional transparent indicator tube having a scale which reads a multiple of the amount on said first scale, pistons individually responsive to the application of the brakes for a plurality of the wheels of a vehicle and operable in said plurality of cylinders to elevate the liquid in said plurality of indicator tubes to indicate at said plurality of indicator tubes the amount of brake effort for each wheel, a piston collectively responsive to the application of the brakes for a plurality of the vehicle wheels and operable in said additional cylinder to elevate the liquid in said additional indicator tube to indicate at said additional indicator tube the total sum of the brake effort at a plurality of said brakes, a plurality of vertically movable recorder members individually operable by the application of the brakes for said plurality of the wheels of the vehicle for recording the amount of brake effort at each brake, and an additional vertically movable recorder member collectively responsive to the application of the brakes of a plurality of the vehicle wheels for recording the total sum of the brake effort at said plurality of said brakes.

15. A brake tester according to claim 14 wherein the plurality of vertically movable recorder members and the additional recorder member each carries a recording punch which punches are adapted to be forced through a card to record the amount of brake effort at each wheel and the total sum of the brake effort at a plurality of the wheels.

16. In a brake tester, in combination, an indicating head having four cylinders grouped around it and in which liquid is adapted to be disposed, four transparent indicator tubes in communication with said cylinders through restriction valves, said head having a fifth cylinder grouped with said four cylinders and in communication with a fifth transparent indicator tube, said four transparent indicator tubes each having a first scale for indicating by the height of the liquid therein the braking effort at the brakes of the four wheels of a vehicle, said fifth transparent indicator tube having a scale which reads four times the amount on said first scale, pistons individually responsive to the application of the brakes for the four wheels of a vehicle and operable in said four cylinders to elevate the liquid in said four indicator tubes to indicate at said four indicator tubes the amount of brake effort for each wheel, a piston collectively responsive to the application of the brakes for all of the vehicle wheels and operable in said fifth cylinder to elevate the liquid in said fifth indicator tube to indicate at said fifth indicator tube the total sum of the brake effort at all of said brakes, four vertically movable recorder members individually movable to recording positions by the application of the brakes for the four wheels of the vehicle, a fifth vertically movable recorder member movable to recording position collectively by the application of all of the brakes, a punch carried by each of said recorder members, a card holder for holding a card in proximity to said punches, and manually operable means for forcing said punches through a card in said holder simultaneously to record the amount of brake effort at each brake and the total sum of the brake effort at all of said brakes.

17. A brake tester according to claim 16 wherein the manually operable means for forcing the punches through a card comprises a lever pivoted to a frame which holds the recorders in alignment and a punch plate pivoted to said lever and cooperable with said punches upon actuation of said lever.

18. In a brake tester, in combination, four vertically movable recorder members individually movable to recording positions by the application of the brakes for the four wheels of a vehicle, a fifth vertically movable recorder member movable to recording position collectively by the application of all of the brakes, a punch carried by each of said recorder members, a card holder for holding a card in proximity to said punches, and manually operable means for forcing said punches through a card in said holder simultaneously to record the amount of brake effort at each brake and the total sum of the brake effort at all of said brakes.

19. A brake tester according to claim 18 wherein the manually operable means for forcing the punches through a card comprises a lever pivoted to a frame which holds the recorders in alignment and a punch plate pivoted to said lever and cooperable with said punches upon actuation of said lever.

20. In a brake tester, in combination, a plurality of first members movable in response to the application of the brakes of a vehicle, a plurality of recording members one connected to each of said first members for movement by the movement of said first members to positions for recording the amount of brake effort at each brake, an additional recording member, and an operative connection between said first members and said additional recording member, said operative connection including mechanical connection with said first members which is collectively responsive to the movements of said first members and effective when the brakes are applied to move said additional recording member to position for recording the total sum of the brake effort at a plurality of said brakes.

21. In a brake tester, in combination, a plurality of first members movable in response to the application of the brakes of a vehicle, a plurality of recording members one connected to each of said first members for movement by the movement of said first members to positions for recording the amount of brake effort at each wheel, and an additional recording member connected for actuation collectively by the movement of said first members to position for recording the total sum of the brake effort at a plurality of said brakes, said recording members comprising vertically slidable bars grouped together and each carrying a punch which is adapted to be projected through a card by the actuation of actuating means therefor.

22. In a brake tester, in combination, a plurality of first members movable in response to the application of the brakes of a vehicle, a plurality of recording members one connected to each of said first members for movement by the movement of said first members to positions for recording the amount of brake effort at each brake, and an additional recording member connected for actuation collectively by the movement of said first members to position for recording the total sum of the brake effort at a plurality of said brakes, said recording members comprising vertically slidable bars grouped together and carrying recording portions for making a record of the brake effort at each brake and the total sum of the brake effort at a plurality of said brakes.

23. In a brake tester, in combination, a plurality of first members movable in response to the application of the brakes of a vehicle, a rectilinearly movable recording bar, recording means on said bar, a mechanical connection between said first members and said recording bar which is collectively responsive to the movements of said first members and effective when the brakes are applied to move said recording bar to position said recording means to correspond with the brake effort at a plurality of said brakes, and means for actuating said recording means when in said position to record the total sum of the brake effort at said plurality of brakes.

24. In a brake tester, in combination, a plurality of first members movable in response to the application of the brakes of a vehicle, a plurality of rectilinearly movable recording bars one connected mechanically to each of said first members for movement therewith, recording means on said bars for movements by the movements of said recording bars to positions corresponding with the braking efforts at the respective brakes, and means for actuating said recording means when in said positions to record the amount of brake effort at each brake.

25. In a brake tester, in combination, a plurality of first members movable in response to the application of the brakes of a vehicle, an indicator head having a cylinder in which liquid is adapted to be disposed, a transparent indicator tube in communication with said cylinder, and a piston collectively responsive to the movements of all of said first members and operable in said cylinder to elevate the liquid in said indicator tube in amount to indicate the sum of the brake effort at all of said brakes.

26. In apparatus of the character described, in combination, a plurality of first members movable in response to the application of the brakes of a vehicle, means individually responsive to the movements of said members for making a permanent record of the brake effort at each brake, and means collectively responsive to the movements of said members for making a permanent record of the total sum of the brake effort at a plurality of said brakes.

27. In a brake tester, in combination, a plurality of members movable in response to the brakes of a vehicle, brake effort indicators responsive to the movements of said first members for indicating the brake effort at each brake, a totalizing indicator collectively responsive to the movements of said members for indicating the total sum of the brake effort at a plurality of said brakes, and means for making a permanent record of the brake effort at each brake and permanent record of the total sum of the brake effort at a plurality of said brakes.

References Cited in the file of this patent

UNITED STATES PATENTS

| | | |
|---|---|---|
| 1,812,620 | Braitmayer | June 30, 1931 |
| 1,883,180 | Weaver | Oct. 18, 1932 |
| 1,892,919 | Weaver | Jan. 3, 1933 |
| 2,003,912 | Weaver et al. | June 4, 1935 |
| 2,190,912 | Moore | Feb. 20, 1940 |